(12) United States Patent
Fujii et al.

(10) Patent No.: US 6,191,207 B1
(45) Date of Patent: Feb. 20, 2001

(54) POLYAMIDE RESIN COMPOSITION AND MOLDED ARTICLES

(75) Inventors: Osamu Fujii; Harumi Watanabe, both of Nobeoka (JP)

(73) Assignee: Asahi Kasei Kogyo Kabushiki Kaisha, Osaka (JP)

(*) Notice: Under 35 U.S.C. 154(b), the term of this patent shall be extended for 0 days.

(21) Appl. No.: 09/213,370

(22) Filed: Dec. 17, 1998

(30) Foreign Application Priority Data

Jun. 19, 1997 (JP) .................................................... 9162317

(51) Int. Cl.[7] ............................... C08K 3/40; C08L 77/10
(52) U.S. Cl. ............................................. 524/494; 524/606
(58) Field of Search ..................................... 524/493, 606, 524/494

(56) References Cited

U.S. PATENT DOCUMENTS

| | | | | |
|---|---|---|---|---|
| 4,528,304 | * | 7/1985 | Yoshimura et al. | 524/606 |
| 5,236,988 | * | 8/1993 | Doyama et al. | 524/443 |
| 5,846,478 | * | 12/1998 | Onishi et al. | 264/523 |

FOREIGN PATENT DOCUMENTS

| | | |
|---|---|---|
| 53-51251 | 5/1978 | (JP) . |
| 53-135725 | 11/1978 | (JP) . |
| 61-60861 B2 | 12/1986 | (JP) . |
| 63-156856 | 6/1988 | (JP) . |
| 673288 | 3/1994 | (JP) . |
| 8269228 | 10/1996 | (JP) . |
| 10120900 | 5/1998 | (JP) . |

* cited by examiner

*Primary Examiner*—Tae Yoon
(74) *Attorney, Agent, or Firm*—Birch, Stewart, Kolach & Birch LLP

(57) ABSTRACT

A polyamide resin composition comprising: from 30 to 70% by weight of a polyamide resin having a crystallization temperature not higher than 210° C.; and from 70 to 30% by weight of glass fiber having an average aspect ratio of from 10 to 20, and an average fiber diameter of from 15 to 30 $\mu$m. Also disclosed is a polyamide resin molded article comprising: from 30 to 70% by weight of a polyamide resin having a crystallization temperature not higher than 210° C.; and from 70 to 30% by weight of glass fiber having an average aspect ratio of from 9 to 18, and an average fiber diameter of from 15 to 30 $\mu$m.

11 Claims, No Drawings

POLYAMIDE RESIN COMPOSITION AND MOLDED ARTICLES

FIELD OF THE INVENTION

The present invention relates to a polyamide resin composition which is excellent in surface smoothness, mechanical properties and weatherability, and to a molded article thereof.

BACKGROUND OF THE INVENTION

Polyamide resins are widely, used in various application fields because they have excellent mechanical properties and can be improved remarkably in their strength and rigidity by reinforcement with glass fiber. However, polyamide compositions containing glass fiber at a relatively higher content for the improvement of the strength and rigidity have problems, for example, such that articles molded by injection molding have poor appearance owing to emergence of the glass fiber on the molded article surface.

To solve such problems, a composition is disclosed which employs a polyamide having a relatively low crystallization temperature among polyamide resins such as those derived by copolymerization of adipic acid and m-xylylenediamine (hereinafter referred to as "nylon MXD6") or by copolymerization of adipic acid, isophthalic acid and hexamethylenediamine (hereinafter referred to as "nylon 66/6I copolymer"), and which polyamide is reinforced by glass fiber.

As other methods for improving the appearance of the molded articles, for example, JP-A-56-30460, and JP-A-63-156856 (The term "JP-A" as used herein means an "unexamined published Japanese patent application.) disclose resin compositions composed of a polyester resin or a nylon 46 resin and glass fiber incorporated therein, in which the glass fiber length is regulated for improving the balance between external appearance and mechanical properties. The aforementioned fiber-reinforced resin compositions produce molded articles having good appearance by preventing emergence of glass fiber out of the article surface to a certain extent. However, such compositions are not yet satisfactory for uses requiring more excellent appearance such as surface smoothness free from periodic roughness of about 1 to 5 mm period generated on a molded article surface (hereinafter referred to as "waviness"), and do not give sufficient mechanical properties of the resulting molded articles. In particular, nylon 46 has a crystallization temperature as high as 250° C. and does not produce a molded article having satisfactory appearance. Moreover, nylon 46 cannot be readily molded owing to the narrow range of the applicable molding conditions.

To solve the above problems, the inventors of the present invention paid attention to the glass fiber in the glass fiber-reinforced polyamide resin. They found that the polyamide resin composition is improved in the surface smoothness and the balance of mechanical properties by regulating the average aspect ratio of the glass fiber and the content of a fraction having a high aspect ratio in the glass fiber. Thus, an application has been filed for the invention as disclosed in JP-A-10-120900.

The aforementioned polyamide composition, however, is not satisfactory yet for use in application fields which require higher mechanical strength, especially higher level of impact strength, more excellent appearance (gloss and surface smoothness), and higher weatherability (especially, resistance to phenomena that articles under conditions where they are used are deteriorated by exposure to ultraviolet light and rain (water) to cause emergence of the glass fiber on the article surface, thereby whitening the article with loss of gloss).

SUMMARY OF THE INVENTION

The present invention is to solve the above described problems of the conventional polyamide composition.

Accordingly, an object of the present invention is to provide a polyamide resin composition which is capable of providing a molded article excellent in mechanical properties (especially, impact resistance), weatherability, surface gloss and surface smoothness.

Another object of the present invention is to provide a molded article produced from the polyamide resin composition.

Other objects and effects of the present invention will become apparent from the following description.

To solve the above problems, the inventors of the present invention further studied comprehensively polyamide resin compositions and constituting components thereof. As the results, the inventors found a polyamide resin molded article having more excellent appearance and being superior in impact strength and weatherability.

In particular, the inventors of the present invention found surprisingly that the impact resistance (notched Izod characteristics) and weatherability are remarkably improved by use of glass fiber having a larger diameter than conventional ones. Consequently, the inventors have accomplished the present invention.

That is, the above described objects of the present invention have been achieved by providing the following polyamide resin compositions and polyamide resin molded articles.

1) A polyamide resin composition comprising:
    from 30 to 70% by weight of a polyamide resin having a crystallization temperature not higher than 210° C.; and
    from 70 to 30% by weight of glass fiber having an average aspect ratio of from 10 to 20, and an average fiber diameter of from 15 to 30 $\mu$m.

2) The polyamide resin composition according to the above 1, wherein the content of a fraction having an aspect ratio of not more than 5 in said glass fiber is not more than 15% by weight based on the weight of said glass fiber.

3) The polyamide resin composition according to the above 1), wherein said polyamide resin is a copolymer comprising:
    (a) from 70 to 95% by weight of a hexamethylene adipamide component obtained from adipic acid and hexamethylenediamine; and
    (b) from 30 to 5% by weight of a hexamethylene isophthalamide component obtained from isophthalic acid and hexamethylenediamine.

4) The polyamide resin composition according to the above 2), wherein said polyamide resin is a copolymer comprising:
    (a) from 70 to 95% by weight of a hexamethylene adipamide component obtained from adipic acid and hexamethylenediamine; and
    (b) from 30 to 5% by weight of a hexamethylene isophthalamide component obtained from isophthalic acid and hexamethylenediamine.

5) A polyamide resin molded article comprising:
    from 30 to 70% by weight of a polyamide resin having a crystallization temperature not higher than 210° C.; and from 70 to 30% by weight of glass fiber having an average aspect ratio of from 9 to 18, and an average fiber diameter of from 15 to 30 μm.

6) The polyamide resin molded article according to the above 5), wherein the content of a fraction having an aspect ratio of not more than 5 in said glass fiber is not more than 15% by weight based on the weight of said glass fiber.

7) The polyamide resin molded article according to the above 5), wherein said polyamide resin is a copolymer comprising:
   (a) from 70 to 95% by weight of a hexamethylene adipamide component obtained from adipic acid and hexamethylenediamine; and
   (b) from 30 to 5% by weight of a hexamethylene isophthalamide component obtained from isophthalic acid and hexamethylenediamine.

8) The polyamide resin molded article according to the above 6), wherein said polyamide resin is a copolymer comprising:
   (a) from 70 to 95% by weight of a hexamethylene adipamide component obtained from adipic acid and hexamethylenediamine; and
   (b) from 30 to 5% by weight of a hexamethylene isophthalamide component obtained from isophthalic acid and hexamethylenediamine.

9) The polyamide resin molded article according to the above 5), wherein said molded article is an injection-molded article.

10) The polyamide resin molded article according to the above 6), wherein said molded article is an injection-molded article.

11) The polyamide resin molded article according to the above 7), wherein said molded article is an injection-molded article.

12) The polyamide resin molded article according to the above 8), wherein said molded article is an injection-molded article.

DETAILED DESCRIPTION OF THE INVENTION

The present invention is described below in detail.

The polyamide resin composition of the present invention comprises a polyamide resin and glass fiber.

The polyamide resin for use in the present invention should have a crystallization temperature of not higher than 210° C. The crystallization temperature in the present invention is a peak top temperature of a crystallization peak in a differential thermal analysis chart obtained using a differential scanning calorimeter (DSC) by keeping a sample at a temperature higher by 20° C. than its melting point for 5 minutes and then cooling at a rate of 20° C./min.

The polyamide resin having a crystallization temperature of not higher than 210° C. for use in the present invention includes homopolymers and copolymers derived from appropriate combination of nylon-forming monomers such as ε-caprolactam, adipic acid, sebacic acid, dodecanedioic acid, isophthalic acid, terephthalic acid, hexamethylenediamine, tetramethylenediamine, 2-methylpentamethylenediamine, 2,2,4-trimethylhexamethylenediamine, 2,4,4-trimethylhexamethylenediamine, m-xylylenediamine, and bis(3-methyl-4-aminocyclohexyl)methane; mixtures of two or more of the homopolymers; mixtures of two or more of the copolymers; and mixtures of two or more of the copolymers and the homopolymers. Specific examples of the polyamide resin include homopolymers such as nylon 6, nylon 610, nylon 612, nylon 11, nylon 12, nylon MXD6, a nylon produced by polymerization of hexamethylenediamine and isophthalic acid (nylon 6I), and a nylon produced by polymerization of isophthalic acid and bis(3-methyl-4-aminocyclohexyl)-methane (nylon PACMI); copolymer nylons such as a nylon produced by polymerization of adipic acid, isophthalic acid and hexamethylenediamine (nylon 66/6I copolymer), a nylon produced by polymerization of isophthalic acid, terephthalic acid and hexamethylenediamine (nylon 6I/6T copolymer), a nylon produced by polymerization of terephthalic acid, 2,2,4-trimethylhexamethylenediamine and 2,4,4-trimethylhexamethylenediamine (nylon TMDT copolymer), and a nylon produced by polymerization of isophthalic acid, terephthalic acid, hexamethylenediamine and bis(3-methyl-4-aminocyclohexyl)methane; a mixture of a copolymer nylon produced by polymerization of isophthalic acid, terephthalic acid, hexamethylenediamine and bis(3-methyl-4-aminocyclohexyl)methane, and nylon 6; and a blend of nylon MXD6 and nylon 66. However, the polyamide resin for use in the present invention is not limited thereto.

If the crystallization temperature of the polyamide resin and/or the polyamide resin molded article is higher than 210° C., the resulting molded article has inferior external appearance with many bared glass fiber emerging out of the surface. Thus, excellent external appearance cannot be obtained.

A particularly preferred polyamide resin for use in the present invention is a copolymer comprising (a) 70 to 95% by weight of hexamethylene adipamide component (hereinafter referred to as "66 component") derived from adipic acid and hexamethylenediamine, and (b) 30 to 5% by weight of hexamethylene isophthalamide component (hereinafter referred to as "6I component") derived from isophthalic acid and hexamethylenediamine. The molded article obtained using this polyamide resin is less apt to be deteriorated in its mechanical properties when it absorbs water, and is excellent in balance of appearance (gloss), mechanical properties (strength, rigidity and impact resistance) and weatherability.

If the content of the aforementioned 6I component is less than 5% by weight, emergence of glass fiber out of the molded article surface tends to be conspicuous. Particularly, at a higher content of the glass fiber, the appearance is not always satisfactory, and there may be a possibility that the mechanical properties become poor when absorbing water. On the other hand, if the content of the 6I component is higher than 30% by weight, the resin becomes substantially amorphous. Therefore, the resulting mechanical properties are not always sufficient, and there may cause a concern that molding conditions are limited such that the mold needs to be heated up to a temperature higher than 100° C. for obtaining satisfactory appearance of a molded article.

The molecular weight of the polyamide resin used is not limited particularly in the present invention. However, the sulfuric-acid relative viscosity (ηr: measured in 100 ml of 95.5% sulfuric acid solution per 1 g of polymer at 25° C.) thereof is preferably from 1.5 to 3.5, more preferably from 2.0 to 3.0.

The glass fiber for use in the present invention may be any glass fiber conventionally use as a reinforcing material, and is not limited particularly. For example, the glass fiber may be any one of chopped strands preliminarily cut in a length of from 0.2 to 6 mm, milled fibers and cut fibers preliminarily milled or cut to have a prescribed fiber length distribution. The glass fiber may be treated, if necessary, at the surface with a binder, a coupling agent or the like.

The glass fiber for use in the polyamide resin composition of the present invention should have an average aspect ratio of from 10 to 20, and an average fiber diameter of from 15 to 30 μm. Further, the content of a fraction having an aspect ratio of not more than 5 in the glass fiber is preferably not more than 15% by weight based on the total weight of the glass fiber. The average aspect ratio of the glass fiber is more preferably from 12 to 19, and the average fiber diameter is more preferably from 20 to 25 μm. Glass fiber having an aspect ratio of less than 10 does not give sufficient mechanical properties expected from the content thereof in the resin, whereas glass fiber having an aspect ratio of more than 20 may cause conspicuous waviness on the molded article surface. Glass fiber having an average diameter of less than 15 μm cannot give sufficient impact strength nor sufficient weatherability even if the average aspect ratio is controlled within the range from 10 to 20, whereas glass fiber having an average diameter of more than 30 μm cannot give sufficient mechanical strength expected from the content of the glass fiber. Further, glass fiber having an average fiber diameter of more than 30 μm undesirably involves problems in productivity, handling, etc. If the content of a fraction having an aspect ratio of less than 5 in the glass fiber is higher than 15% by weight, it may result in insufficient impact resistance (notched Izod impact strength).

The glass fiber in the polyamide resin molded article of the present invention should have an average aspect ratio of from 9 to 18 and an average fiber diameter of from 15 to 30 μm. Further, the content of a fraction having an aspect ratio of not more than 5 in the glass fiber is preferably not more than 15% by weight based on the total weight of the glass fiber. The average aspect ratio of the glass fiber is more preferably from 11 to 16, and the average fiber diameter is more preferably from 20 to 25 μm. Glass fiber having an aspect ratio of less than 9 does not give sufficient mechanical properties expected from the content thereof in the resin, whereas glass fiber having an aspect ratio of more than 18 may cause conspicuous waviness on the molded article surface. Glass fiber having an average diameter of less than 15 μm cannot give sufficient impact strength nor sufficient weatherability even if the average aspect ratio is controlled within the range from 10 to 20, whereas glass fiber having an average diameter of more than 30 μm cannot give sufficient mechanical strength expected from the content of the glass fiber. Further, glass fiber having an average fiber diameter of more than 30 μm undesirably involves problems in productivity, handling, etc. If the content of a fraction having an aspect ratio of less than 5 in the glass fiber is higher than 15% by weight, it may result in insufficient impact resistance (notched Izod impact strength).

As described above, the inventors of the present invention have disclosed in JP-A-10-120900 that polyamide resin compositions are improved in the surface smoothness and the balance of mechanical properties by regulating the average aspect ratio of the glass fiber and the content of high aspect ratio glass fiber. The present invention further remarkably improves polyamide resin compositions in the balance of their mechanical properties (especially notched Izod characteristics) and their appearance (gloss and surface smoothness).

In the measurement for the polyamide resin composition in the present invention, the average glass fiber diameter and the average aspect ratio of the glass fiber, and the content of a glass fiber fraction having an aspect ratio of not more than 5 are obtained by optical microscopic measurement with from 300 to 1000 pieces of glass fiber randomly selected from polyamide resin composition pellets. A number-average fiber diameter is taken as the average glass fiber diameter. The average aspect ratio is a ratio of the weight-average fiber length to the number-average fiber diameter. The content of the glass fiber fraction having an aspect ratio of not less than 5 in the glass fiber is derived from the distribution data of the glass fiber diameter and of the glass fiber length measured from the selected 300 to 1000 pieces of glass fiber. In the case of measurement for the molded article of the polyamide resin, the molded article is cut into pellets of such a size that the glass fiber length is not affected (e.g., 3-mm cube). The average glass fiber diameter, the average aspect ratio, and the content of the glass fiber fraction having an aspect ratio of not more than 5 are determined in the same manner as described above for the polyamide resin composition.

The polyamide resin and the glass fiber for use in the present invention is blended to have a proportion of 30 to 70% by weight of the polyamide resin and 70 to 30% by weight of the glass fiber. If the content of the polyamide resin is less than 30% by weight, the glass fiber is bared at the surface of the molded article to significantly impair the external appearance. If the content of the polyamide resin is more than 70% by weight, the mechanical properties cannot reach the desired level. In the region of low glass fiber contents, relatively good external appearance having less waviness can be obtained without limiting the aspect ratio of the glass fiber.

The polyamide resin composition of the present invention is not limited in the process of the production. It can be produced by melt-blending the polyamide resin and the glass fiber by means of a conventional single-screw or twin-screw extruder and extruding the blended article into pellets. The average aspect ratio of the glass fiber can be controlled to be within the specific range according to the present invention, for example, by using glass fiber of a suitable aspect ratio and selecting the melt-blending temperature, the extrusion rate, the design of the screw, the rotation speed of the screw, and the material feeding position.

The polyamide resin composition of the present invention is produced usually in a form of pellets. The pellets can be molded into a molded article by various molding process including compression molding, injection molding, extrusion molding, etc. The polyamide resin composition of the present invention is effective especially for injection molded articles. The injection-molded articles according to the present invention include articles produced by special injection molding such as gas-assisted molding, and two-color molding.

The injection molding can be conducted, for example, under the conditions of the molding temperature of from 250 to 310° C. and the mold temperature of from 40 to 120° C.

The polyamide resin composition of the present invention may contain suitably one or more conventional additives, such as stabilizers or inhibitors against deterioration by oxidation, heat and ultraviolet light; lubricating agents; release agents; dyes, pigments and other colorants; nucleating agents; foaming agents; plasticizers; inorganic fillers; flame retardants; and antistatic agents, as long as the addition does not impair the objects of the present invention.

The present invention will be described in detail with reference to Examples and Comparative Examples, but the invention should not be construed as being limited thereto.

Evaluation methods of the resin composition and the molded articles, the kinds of the polyamide resin and the glass fiber employed, and the pellet production process are described below.

A. Evaluation of Resin Compositions and Molded Articles (1) Average diameter and average aspect ratio of glass fiber, and content of glass fiber fraction having aspect ratio of less than 5 in glass fiber, contained in resin composition:

A pelletized polyamide resin composition was put into formic acid to dissolve the polyamide and to precipitate the glass fiber. The resulting precipitate is observed under optical microscopy. 300 to 1000 pieces of the glass fiber were randomly selected and were measured for fiber length and the fiber diameter by means of an image analyzer IP-1000 (manufactured by Asahi Chemical Industry Co., Ltd.) to obtain the weight-average fiber length and the number-average fiber diameter. Therefrom, the average aspect ratio was obtained by dividing the weight-average fiber length by the number-average fiber diameter. The content of a glass fiber fraction having an aspect ratio of less than 5 was obtained from the distribution data of fiber length and of the fiber diameter.

(2) Crystallization temperature:

The crystallization temperature of the polyamide resin of the composition was measured by use of pellets of the source polymer material or disintegrated pellets thereof as the test sample. The crystallization temperature of the polyamide resin molded article was measured by use of the molded article after the tensile test of the following Item (3) by cutting into cubes of about 3 mm sides as the test sample. The test sample was subjected to measurement with a differential thermal analyzer DSC7 (manufactured by Perkin Elmer Co.) by keeping the test sample at a temperature higher by 20° C. than the melting point for 5 minutes, and then cooling at a rate of 20° C./min to obtain a differential thermal analysis chart. The temperature at the top of the crystallization peak in the differential thermal analysis chart was defined as the crystallization temperature.

(3) Tensile properties:

A test specimen was prepared with an injection machine IS50EP (manufactured by Toshiba Machine Co.) at a cylinder temperature of 290° C. by controlling appropriately the injection pressure and injection rate to attain the filling time of about one second.

The mold temperature was adjusted, according to the glass transition temperature of the composition, in the range from 80 to 120° C. The resulting test specimen was subjected to measurement of the tensile strength and the tensile elongation according to ASTM D638.

(4) Flexural properties:

A test specimen was prepared in the same manner as the one for the tensile property measurement in the above Item (3). The flexural strength, and the flexural modulus were measured according to ASTM D790.

The evaluation of the flexural properties of the specimen in a humidified state was measured after equilibration of the water content of the test specimen in an atmosphere at 23° C. at a relative humidity of 50%.

(5) Izod impact strength:

A test specimen was prepared in the same manner as the one for the tensile property measurement in the above Item (3). The notched Izod impact strength was measured according to ASTM D256.

(6) Surface gloss:

A test specimen in a shape of a plate of 100×90×3 mm was prepared with an injection machine IS150E (manufactured by Toshiba Machine Co.) at a cylinder temperature of 290° C. at a filling rate of about 1.5 seconds controlled by the injection pressure and speed.

The mold temperature was adjusted according to the glass transition temperature of the composition in the range from 80 to 120° C. For more sensitive evaluation of the surface gloss, the molded article was colored black by blending 2.5 parts by weight of a carbon black type nylon master batch F-36600B-20S (produced by Dainippon Ink and Chemicals, Inc.) was blended to 100 parts by weight of the pelletized polyamide resin composition of the present invention prior to the injection molding.

The value of Gs 60° of the test specimen was measured at the middle portion thereof according to JIS-K7150 with a handy glossmeter IG320 (manufactured by HORIBA, Ltd.).

(7) Surface smoothness:

The plate-shaped test specimen as described in the above Item (6) was evaluated visually for occurrence of surface waviness. Specimens having no waviness visually over the entire surface were designated as ⊙, specimens having waviness locally in limited portion visually were designated as ○, and specimens having remarkable waviness visually over the entire surface were designated as x.

(8) Surface roughness:

The plate-shaped test specimen as described in the above Item (6) was subjected to measurement of surface roughness Ra (center-line average roughness) and Rmax (maximum height) according to JIS B 0601 with a surface roughness tester, SE 30K, and a surface roughness analyzer, AY-31 (both manufactured by Kosaka Laboratry Ltd.). A larger value of Ra or Rmax means greater roughness.

(9) Weatherability:

The plate-shaped test specimen as described in the above Item (6) was subjected to an accelerated weathering test at 83° C. for 300 hours at a shower cycle of 10 minutes/60 minutes with a xenon weatherometer, Xnotester 1200LM (manufactured by Atlas Co.).

A color difference (AE) caused by the accelerated weathering was measured with a color difference meter, ND-300A (manufactured by Nippon Denshokusha K.K.). The smaller color difference means higher weatherability. (10) Average diameter and average aspect ratio of glass fiber, and content of glass fiber fraction having aspect ratio of less than 5 in glass fiber, contained in molded article:

The measurement was conducted in the same manner as in the above Item (1), except that the plate-shaped molded article as described in the above Item (6) was cut into cubes of about 3-mm sides as the sample.

B. Polyamide Resin and Glass Fiber Employed (1) Polyamide resins
  (a) Nylon 66: Leona® 1300 (Asahi Kasei Kogyo K.K.)
  (b) Nylon 6: SF1013A (Ube Industries, Ltd.)
  (c) Nylon MXD6: Reny® 6002 (Mitsubishi Engineering-Plastics Co.)
  (d) Nylon 66/6I copolymer: Prepared as described in Production Example 1–3 below
  (e) Nylon 46: Nylon 46C2000 (Teijin Ltd.)

(2) Glass fiber
  (a) CS03MA416 (Asahi Fiber Glass Co.) Average fiber length: 13 $\mu$m
  (b) Experimental Product (Asahi Fiber Glass Co.) Average fiber length: 18 $\mu$m
  (c) CS03TA416 (Asahi Fiber Glass Co.) Average fiber length: 23 $\mu$m (d) Experimental Product (Asahi Fiber Glass Co.) Average fiber length: 28 μm (e) Experimental Product (Asahi Fiber Glass Co.) Average fiber length: 36 μm C. Method of Pelletization of Polyamide Resin Composition A suitably selected combination of the above polyamide resin and the above glass fiber was melt-blended by means of a twin-screw extruder, TEM35 (manufactured by Toshiba Machine Co.), into pellets.

The aspect ratio of the glass fiber in the produced pellets was controlled by selecting the glass fiber feed position, the extrusion rate (ranging from 30 to 90 kg/hr), the temperature (ranging from 250 to 300° C.), and screw rotation rate (ranging from 250 to 450 rpm).

Production Examples

Nylon 66/6I Copolymer Production Example 1

Into a 5-liter autoclave, were charged 2.0 kg of an equimolar salt of adipic acid and hexamethylenediamine, 0.5 kg of an equimolar salt of isophthalic acid and hexamethylenediamine, and 2.5 kg of pure water. The autoclave was purged sufficiently by nitrogen with sufficient stirring of the charged matter. With the stirring continued, the autoclave was heated from room temperature to 220° C. over about one hour. Further, the heating was conducted to raise the temperature up to 260° C. over about 2 hours with the internal pressure of the autoclave kept at 18 kg/cm$^2$-G by removing water appropriately out of the reaction system. Then the heating was stopped, and the autoclave was tightly closed and was cooled to room temperature over about 8 hours. Thereby, about 2 kg of a nylon 66/6I polymer was obtained (composition ratio by weight: 78.5/21.5). The obtained polymer was crushed. The crushed polymer was treated for solid phase polymerization under a nitrogen stream at 200° C. for 10 hours by means of a 10-liter evaporator to increase further the molecular weight. The solid phase polymerization increased the sulfuric-acid relative viscosity (ηr) of the polymer from 1.38 to 2.30.

Nylon 66/6I Copolymer Production Example 2

Into a 5-liter autoclave, were charged 2.0 kg of an equimolar salt of adipic acid and hexamethylenediamine, 0.32 kg of an equimolar salt of isophthalic acid and hexamethylenediamine, and 2.32 kg of pure water. The autoclave was purged by nitrogen sufficiently with sufficient stirring of the charged matter. With the stirring continued, the autoclave was heated from room temperature to 220° C. over about one hour. Further, the heating was conducted to raise the temperature up to 260° C. over about 2 hours with the internal pressure of the autoclave kept at 18 kg/cm$^2$-G by removing water appropriately out of the reaction system. Then the heating was stopped, and the autoclave was tightly closed and was cooled to room temperature over about 8 hours. Thereby, about 2 kg of a nylon 66/6I polymer was obtained (composition ratio by weight: 85/15). The obtained polymer was crushed. The crushed polymer was treated for solid phase polymerization under a nitrogen stream at 200° C. for 10 hours by means of a 10-liter evaporator to increase further the molecular weight. The solid phase polymerization increased the sulfuric-acid relative viscosity (ηr) of the polymer from 1.38 to 2.30.

Nylon 66/6I Copolymer Production Example 3

Into a 5-liter autoclave, were charged 2.46 kg of an equimolar salt of adipic acid and hexamethylenediamine, 0.074 kg of an equimolar salt of isophthalic acid and hexamethylenediamine, and 2.5 kg of pure water. The autoclave was purged by nitrogen sufficiently with sufficient stirring of the charged matter. With the stirring continued, the autoclave was heated from room temperature to 220° C. over about one hour. Further, the heating was conducted to raise the temperature up to 260° C. over about 2 hours with the internal pressure of the autoclave kept at 18 kg/cm$^2$-G by removing water appropriately out of the reaction system. Then the heating was stopped, and the autoclave was tightly closed and was cooled to room temperature over about 8 hours. Thereby, about 2 kg of a nylon 66/6I polymer was obtained (composition ratio by weight: 97/3). The obtained polymer was crushed. The crushed polymer was treated for solid phase polymerization under a nitrogen stream at 200° C. for 10 hours by means of a 10-liter evaporator to increase further the molecular weight. The solid phase polymerization increased the sulfuric-acid relative viscosity (ηr) of the polymer from 1.38 to 2.30.

EXAMPLE 1

A crushed nylon 66/6I copolymer obtained in the above production example (Nylon 66/6I copolymer Production Example 1) was fed to the main feed opening of a twin screw extruder TEM35 (manufactured by Toshiba Machine Co.), and glass fiber (CS03TA416) was fed to the side feed opening thereof, through constant-weight feeders, to have a composition ratio shown in Table 1, and melt-blended at an extrusion rate of 50 kg/hr by controlling the cylinder temperature to 290° C. and the screw rotation rate to 450 rpm, to obtain pellets. The evaluation results of the obtained pelletized composition and of the molded article produced therefrom are shown in Table 1.

EXAMPLE 2

A pelletized copolymer composition and a molded article thereof were prepared in the same manner as in Example 1, except that a crushed nylon 66/6I copolymer composition produced in the above production example (Nylon 66/6I Copolymer Production Example 2) was used as the copolymer. The evaluation results of the obtained pelletized composition and of the molded article thereof are shown in Table 1.

EXAMPLE 3–11

Pellets and test specimens were prepared from a composition as shown in Tables 1 to 3, and were evaluated. The evaluation results are shown also in Tables 1 to 3.

EXAMPLE 12

A crushed nylon 66/6I copolymer obtained in the above production example (Nylon 66/6I copolymer Production Example 1), and glass fiber (CS03TA416) were fed to the main feed opening of a twin-screw extruder TEM35 (manufactured by Toshiba Machine Co.) through constant-weight feeders to have a composition ratio as shown in Table 3, and melt-blended at an extrusion rate of 50 kg/hr by controlling the cylinder temperature at 290° C. and the screw rotation rate at 250 rpm, to thereby obtain pellets. The evaluation results of the obtained pelletized composition and of the molded article produced therefrom are shown in Table 3.

Any of the compositions of Examples 1–12 caused little waviness on the surface of the molded article, and was excellent in mechanical properties and in the balance of external appearance, mechanical properties, and weatherability, as apparent from Tables 1–3.

From the comparison of the evaluation results of Example 1 and Example 12, the molded article of Example 12 which contains glass fiber having a content of a glass fiber fraction having an aspect ratio of not higher than 5 of higher than 15% had a relatively lower notched Izod impact strength.

From the comparison of the evaluation results of Example 1 and Example 10, the molded article of Example 1 which was prepared by use of nylon 66/6I was superior in tensile elongation and the notched Izod strength.

Further, the evaluation results of Example 1 and Examples 6–10 show that the mechanical properties, the surface smoothness and the weatherability were well-balanced, particularly when the average glass fiber diameter ranges from 20 to 25 μm and the average aspect ratio ranged from 12 to 19.

COMPARATIVE EXAMPLE 1

A pelletized copolymer composition and a molded article thereof were prepared in the same manner as in Example 1, except that a crushed nylon 66/6I copolymer composition produced in the above production example (Nylon 66/6I Copolymer Production Example 3) was used as the copolymer composition. The evaluation results of the obtained pelletized composition and of the molded article produced therefrom are shown in Table 4.

COMPARATIVE EXAMPLE 2–7

Pellets and test specimens were prepared from a composition as shown in Tables 4 and 5, and were evaluated. The evaluation results are shown in Tables 4 and 5.

As is apparent from Tables 4 and 5, any of the compositions of Comparative Examples gave a molded articles which have waviness or, if no waviness was observed, are inferior in the mechanical properties, especially the impact strength and/or in weatherability, and in the balance of external appearance, the mechanical properties and weatherability.

TABLE 1

|  | Unit | Example | | | | |
| --- | --- | --- | --- | --- | --- | --- |
|  |  | 1 | 2 | 3 | 4 | 5 |
| Nylon species |  | 66/6I | 66/6I | 66/6I | 66/6I | 66/6I |
| Polymer composition ratio | weight ratio | 78.5/21.5 | 85/15 | 78.5/21.5 | 78.5/21.5 | 78.5/21.5 |
| Crystallization temperature | ° C. | 198 | 208 | 198 | 198 | 198 |
| Blending amount | wt % | 40 | 40 | 35 | 67 | 40 |
| Glass fiber |  |  |  |  |  |  |
| Blending amount | wt % | 60 | 60 | 65 | 33 | 60 |
| Average fiber diameter | μm | 23 | 23 | 23 | 23 | 18 |
| Average aspect ratio | — | 13 | 13 | 13 | 13 | 13 |
| Fraction of aspect ratio less than 5* | wt % | 10 | 10 | 10 | 10 | 10 |
| Tensile strength | kg/cm$^2$ | 1900 | 1900 | 2000 | 2000 | 1900 |
| Tensile elongation | % | 6 | 6 | 6 | 6 | 6 |
| Flexural strength | kg/cm$^2$ | 3000 | 3000 | 3000 | 1400 | 3000 |
| Flexural modulus | kg/cm$^2$ | 165000 | 165000 | 170000 | 90000 | 165000 |
| Flexural modulus at humidified state | kg/cm$^2$ | 135000 | 130000 | 140000 | 70000 | 135000 |
| Izod impact strength (notched) | kgcm/cm | 15 | 15 | 15 | 10 | 13 |
| Surface gloss (GS60) | — | 80 | 75 | 75 | 90 | 80 |
| Surface smoothness (visual) | — | ⊚ | ⊚ | ○ | ⊚ | ○ |
| Surface roughness (Ra) | μm | 0.2 | 0.2 | 0.4 | 0.1 | 0.3 |
| Surface roughness (Rmax) | μm | 3 | 3 | 6 | 2 | 4 |
| Weatherability (ΔE) | — | 7 | 8 | 8 | 5 | 9 |
| Molded article |  |  |  |  |  |  |
| Crystallization temperature | ° C. | 198 | 208 | 198 | 198 | 198 |
| Glass fiber in molded article |  |  |  |  |  |  |
| Average fiber diameter | μm | 23 | 23 | 23 | 23 | 18 |
| Average aspect ratio | — | 11 | 11 | 11 | 11 | 10 |
| Fraction of aspect ratio less than 5 | wt % | 10 | 10 | 10 | 10 | 10 |

* Fraction having aspect ratio less than 5 is shown by % by weight based on the total weight of glass fiber.

TABLE 2

|  | Unit | Example | | | | |
| --- | --- | --- | --- | --- | --- | --- |
|  |  | 6 | 7 | 8 | 9 | 10 |
| Nylon species |  | 66/6I | 66/6I | 66/6I | 66/6I | MXD6 |
| Polymer composition ratio | weight ratio | 78.5/21.5 | 78.5/21.5 | 78.5/21.5 | 78.5/21.5 | — |
| Crystallization temperature | ° C. | 198 | 198 | 198 | 198 | 205 |
| Blending amount | wt % | 40 | 40 | 40 | 40 | 40 |
| Glass fiber |  |  |  |  |  |  |
| Blending amount | wt % | 60 | 60 | 65 | 60 | 60 |
| Average fiber diameter | μm | 23 | 23 | 23 | 28 | 23 |

TABLE 2-continued

|  | Unit | Example 6 | Example 7 | Example 8 | Example 9 | Example 10 |
|---|---|---|---|---|---|---|
| Average aspect ratio | — | 10 | 19 | 20 | 13 | 13 |
| Fraction of aspect ratio less than 5* | wt % | 6 | 4 | 4 | 10 | 10 |
| Tensile strength | kg/cm$^2$ | 1700 | 2000 | 2200 | 1800 | 2100 |
| Tensile elongation | % | 6 | 6 | 6 | 5 | 4 |
| Flexural strength | kg/cm$^2$ | 2800 | 3100 | 3200 | 2800 | 3200 |
| Flexural modulus | kg/cm$^2$ | 140000 | 165000 | 170000 | 165000 | 175000 |
| Flexural modulus at humidified state | kg/cm$^2$ | 110000 | 135000 | 140000 | 135000 | 155000 |
| Izod impact strength (notched) | kgcm/cm | 10 | 15 | 15 | 12 | 9 |
| Surface gloss (GS60) | — | 80 | 75 | 75 | 80 | 80 |
| Surface smoothness (visual) | — | ⊚ | ○ | ○ | ○ | ○ |
| Surface roughness (Ra) | μm | 0.1 | 0.4 | 0.4 | 0.2 | 0.1 |
| Surface roughness (Rmax) | μm | 2 | 6 | 6 | 3 | 3 |
| Weatherability (ΔE) | — | 8 | 8 | 9 | 8 | 8 |
| Molded article |  |  |  |  |  |  |
| Crystallization temperature | ° C. | 198 | 198 | 198 | 198 | 205 |
| Glass fiber in molded article |  |  |  |  |  |  |
| Average fiber diameter | μm | 23 | 23 | 23 | 28 | 23 |
| Average aspect ratio | — | 9 | 16 | 17 | 10 | 11 |
| Fraction of aspect ratio less than 5 | wt % | 7 | 6 | 6 | 10 | 10 |

* Fraction having aspect ratio less than 5 is shown by % by weight based on the total weight of glass fiber.

TABLE 3

|  | Unit | Example 11 | Example 12 |
|---|---|---|---|
| Nylon species |  | 6 | 66/6I |
| Polymer composition ratio | weight ratio | — | 78.5/21.5 |
| Crystallization temperature | ° C. | 180 | 198 |
| Blending amount | wt % | 40 | 40 |
| Glass fiber |  |  |  |
| Blending amount | wt % | 60 | 60 |
| Average fiber diameter | μm | 23 | 23 |
| Average aspect ratio | — | 13 | 12 |
| Fraction of aspect ratio less than 5* | wt % | 10 | 20 |
| Tensile strength | kg/cm$^2$ | 1700 | 2000 |
| Tensile elongation | % | 6 | 6 |
| Flexural strength | kg/cm$^2$ | 2900 | 3000 |
| Flexural modulus | kg/cm$^2$ | 160000 | 160000 |
| Flexural modulus at humidified state | kg/cm$^2$ | 90000 | 135000 |
| Izod impact strength (notched) | kgcm/cm | 12 | 9 |
| Surface gloss (GS60) | — | 75 | 83 |
| Surface smoothness (visual) | — | ⊚ | ⊚ |
| Surface roughness (Ra) | μm | 0.2 | 0.3 |
| Surface roughness (Rmax) | μm | 3 | 4 |
| Weatherability (ΔE) | — | 13 | 10 |
| Molded article |  |  |  |
| Crystallization temperature | ° C. | 180 | 198 |
| Glass fiber in molded article |  |  |  |
| Average fiber diameter | μm | 23 | 23 |
| Average aspect ratio | — | 11 | 11 |
| Fraction of aspect ratio less than 5 | wt % | 10 | 20 |

* Fraction having aspect ratio less than 5 is shown by % by weight based on the total weight of glass fiber.

TABLE 4

|  | Unit | Comparative Example 1 | Comparative Example 2 | Comparative Example 3 | Comparative Example 4 | Comparative Example 5 |
|---|---|---|---|---|---|---|
| Nylon species |  | 66/6I | 66 | 46 | 66/6I | 66/6I |
| Polymer composition ratio | weight ratio | 95/5 | — | — | 78.5/21.5 | 78.5/21.5 |
| Crystallization temperature | ° C. | 220 | 225 | 250 | 198 | 198 |
| Blending amount | wt % | 40 | 40 | 40 | 40 | 40 |
| Glass fiber |  |  |  |  |  |  |
| Blending amount | wt % | 60 | 60 | 60 | 60 | 60 |
| Average fiber diameter | μm | 23 | 23 | 23 | 13 | 36 |
| Average aspect ratio | — | 13 | 13 | 13 | 13 | 13 |

TABLE 4-continued

|  | Unit | Comparative Example | | | | |
|---|---|---|---|---|---|---|
|  |  | 1 | 2 | 3 | 4 | 5 |
| Fraction of aspect ratio less than 5* | wt % | 10 | 10 | 10 | 10 | 18 |
| Tensile strength | kg/cm$^2$ | 1900 | 1900 | 2000 | 1900 | 1700 |
| Tensile elongation | % | 6 | 6 | 6 | 6 | 6 |
| Flexural strength | kg/cm$^2$ | 3000 | 3000 | 3000 | 3000 | 2800 |
| Flexural modulus | kg/cm$^2$ | 160000 | 160000 | 165000 | 165000 | 165000 |
| Flexural modulus at humidified state | kg/cm$^2$ | 110000 | 110000 | 100000 | 135000 | 135000 |
| Izod impact strength (notched) | kgcm/cm | 12 | 12 | 14 | 8 | 8 |
| Surface gloss (GS60) | — | 45 | 45 | 40 | 80 | 75 |
| Surface smoothness (visual) | — | X | X | X | ○ | ○ |
| Surface roughness (Ra) | μm | 0.5 | 0.5 | 0.7 | 0.1 | 0.1 |
| Surface roughness (Rmax) | μm | 7 | 7 | 8 | 2 | 2 |
| Weatherability (ΔE) | — | 12 | 12 | 9 | 15 | 9 |
| Molded article |  |  |  |  |  |  |
| Crystallization temperature | °C. | 220 | 225 | 250 | 198 | 198 |
| Glass fiber in molded article |  |  |  |  |  |  |
| Average fiber diameter | μm | 23 | 23 | 23 | 13 | 36 |
| Average aspect ratio | — | 11 | 11 | 11 | 11 | 11 |
| Fraction of aspect ratio less than 5 | wt % | 10 | 10 | 10 | 10 | 19 |

* Fraction having aspect ratio less than 5 is shown by % by weight based on the total weight of glass fiber.

TABLE 5

|  | Unit | Comparative Example | |
|---|---|---|---|
|  |  | 6 | 7 |
| Nylon species |  | 66/6I | 66/6I |
| Polymer composition ratio | weight ratio | 78.5/21.5 | 78.5/21.5 |
| Crystallization temperature | °C. | 198 | 198 |
| Blending amount | wt % | 40 | 40 |
| Glass fiber |  |  |  |
| Blending amount | wt % | 60 | 60 |
| Average fiber diameter | μm | 23 | 23 |
| Average aspect ratio | — | 9 | 22 |
| Fraction of aspect ratio less than 5* | wt % | 30 | 6 |
| Tensile strength | kg/cm$^2$ | 1400 | 2400 |
| Tensile elongation | % | 5 | 6 |
| Flexural strength | kg/cm$^2$ | 2000 | 3200 |
| Flexural modulus | kg/cm$^2$ | 130000 | 170000 |
| Flexural modulus at humidified state | kg/cm$^2$ | 100000 | 140000 |
| Izod impact strength (notched) | kgcm/cm | 9 | 15 |
| Surface gloss (GS60) | — | 80 | 75 |
| Surface smoothness (visual) | — | ⊙ | X |
| Surface roughness (Ra) | μm | 0.1 | 0.8 |
| Surface roughness (Rmax) | μm | 2 | 6 |
| Weatherability (ΔE) | — | 8 | 10 |
| Molded article |  |  |  |
| Crystallization temperature | °C. | 198 | 198 |
| Glass fiber in molded article |  |  |  |
| Average fiber diameter | μm | 23 | 23 |
| Average aspect ratio | — | 8 | 19 |
| Fraction of aspect ratio less than 5 | wt % | 35 | 7 |

* Fraction having aspect ratio less than 5 is shown by % by weight based on the total weight of glass fiber.

As described in detail, the polyamide resin composition and the molded article are remarkably improved in the mechanical properties (especially, impact strength), the external appearance (gloss, smoothness and roughness of the surface) in comparison with conventional products.

While the invention has been described in detail and with reference to specific examples thereof, it will be apparent to one skilled in the art that various changes and modifications can be made therein without departing from the spirit and scope thereof.

What is claimed is:

1. A polyamide resin composition comprising:
   from 30 to 70% by weight of a polyamide resin having a crystallization temperature not higher than 210° C. and consisting essentially of;

(a) from 70 to 95% by weight of a hexamethylene adipamide component obtained from adipic acid and hexamethylenediamine; and (b) from 30 to 5% by weight of a hexamethylene isophthalamide component obtained from isophthalic acid and hexamethylenediamine; and from 70 to 30% by weight of glass fiber having an average aspect ratio of from 10 to 20, and an average fiber diameter of from 15 to 30 μm, and wherein the content of a fraction having an aspect ratio of not more than 5 in said glass fiber is not more than 15% by weight based on the weight of said glass fiber.

2. A polyamide resin molded article comprising:

from 30 to 70% by weight of a polyamide resin having a crystallization temperature not higher than 210° C.; and from 70 to 30% by weight of glass fiber having an average aspect ratio of from 9 to 18, and an average fiber diameter of from 15 to 30 µm.

3. The polyamide resin molded article according to claim 2, wherein the content of a fraction having an aspect ratio of not more than 5 in said glass fiber is not more than 15% by weight based on the weight of said glass fiber.

4. The polyamide resin molded article according to claim 2, wherein said polyamide resin is a copolymer comprising:

(a) from 70 to 95% by weight of a hexamethylene adipamide component obtained from adipic acid and hexamethylenediamine; and (b) from 30 to 5% by weight of a hexamethylene isophthalamide component obtained from isophthalic acid and hexamethylenediamine.

5. The polyamide resin molded article according to claim 3, wherein said polyamide resin is a copolymer comprising:

(a) from 70 to 95% by weight of a hexamethylene adipamide component obtained from adipic acid and hexamethylenediamine; and (b) from 30 to 5% by weight of a hexamethylene isophthalamide component obtained from isophthalic acid and hexamethylenediamine.

6. The polyamide resin molded article according to claim 2, wherein said molded article is an injection-molded article.

7. The polyamide resin molded article according to claim 3, wherein said molded article is an injection-molded article.

8. The polyamide resin molded article according to claim 4, wherein said molded article is an injection-molded article.

9. The polyamide resin molded article according to claim 5, wherein said molded article is an injection-molded article.

10. The polyamide resin composition according to claim 1, wherein the glass fiber has an average fiber diameter of from 20–25 µm.

11. The polyamide resin molded article according to claim 2, wherein the glass fiber has an average fiber diameter of from 20–25 µm.

* * * * *